United States Patent
Lyon

[15] 3,675,682
[45] July 11, 1972

[54] SELF-SEALING MIXTURE VALVE UNIT FOR SINGLE-HANDLED SINK OR LAVATORY FIXTURE

[72] Inventor: John K. Lyon, Pasadena, Calif.
[73] Assignee: Price-Pfister Brass Mfg. Co., Pacoima, Calif.
[22] Filed: Nov. 16, 1970
[21] Appl. No.: 89,559

[52] U.S. Cl. .......................... 137/625.17, 251/172, 251/175
[51] Int. Cl. ................................... F16k 11/02, F16k 19/00
[58] Field of Search ................ 137/625.17, 636.4; 251/172, 251/175

[56] References Cited

UNITED STATES PATENTS

| | | | |
|---|---|---|---|
| 2,977,988 | 4/1961 | Drobilits et al. | 137/625.17 |
| 3,358,714 | 12/1967 | Moen | 137/625.17 |
| 2,977,987 | 4/1961 | Maynard | 137/625.17 |
| 3,542,072 | 11/1970 | Harris et al. | 251/172 X |
| 2,556,780 | 6/1951 | Shryock | 137/625.17 |

*Primary Examiner*—William R. Cline
*Attorney*—Flam and Flam

[57] ABSTRACT

The mixing valve unit comprises a generally cylindrical valve body made of flexible material capable of conforming to companion structures whereby the body itself seals against companion structures under the influence of fluid pressure. The body has a pair of large diameter inlets at opposite ends whereby thin cylindrical walls of the valve body remain. The inlets respectively terminate at their inner ends at spaced flexible convex walls. The inside concave surfaces of the walls complement each other to form a transverse bore into which is fitted a relatively rigid valve control member or stem. The stem has flow control holes both opening into a central chamber, the flow control holes being registrable with small ports in the flexible walls. Angular movement of the stem controls proportion and axial movement controls volume, all in a well known cylindrical coordinate mixing valve system. The body is removably inserted into a simple cylindrical bore of a casting. The thin cylindrical walls of the valve body flex to achieve seals with the casting while the central arcuate walls flex to achieve seals with the valve stem.

12 Claims, 7 Drawing Figures

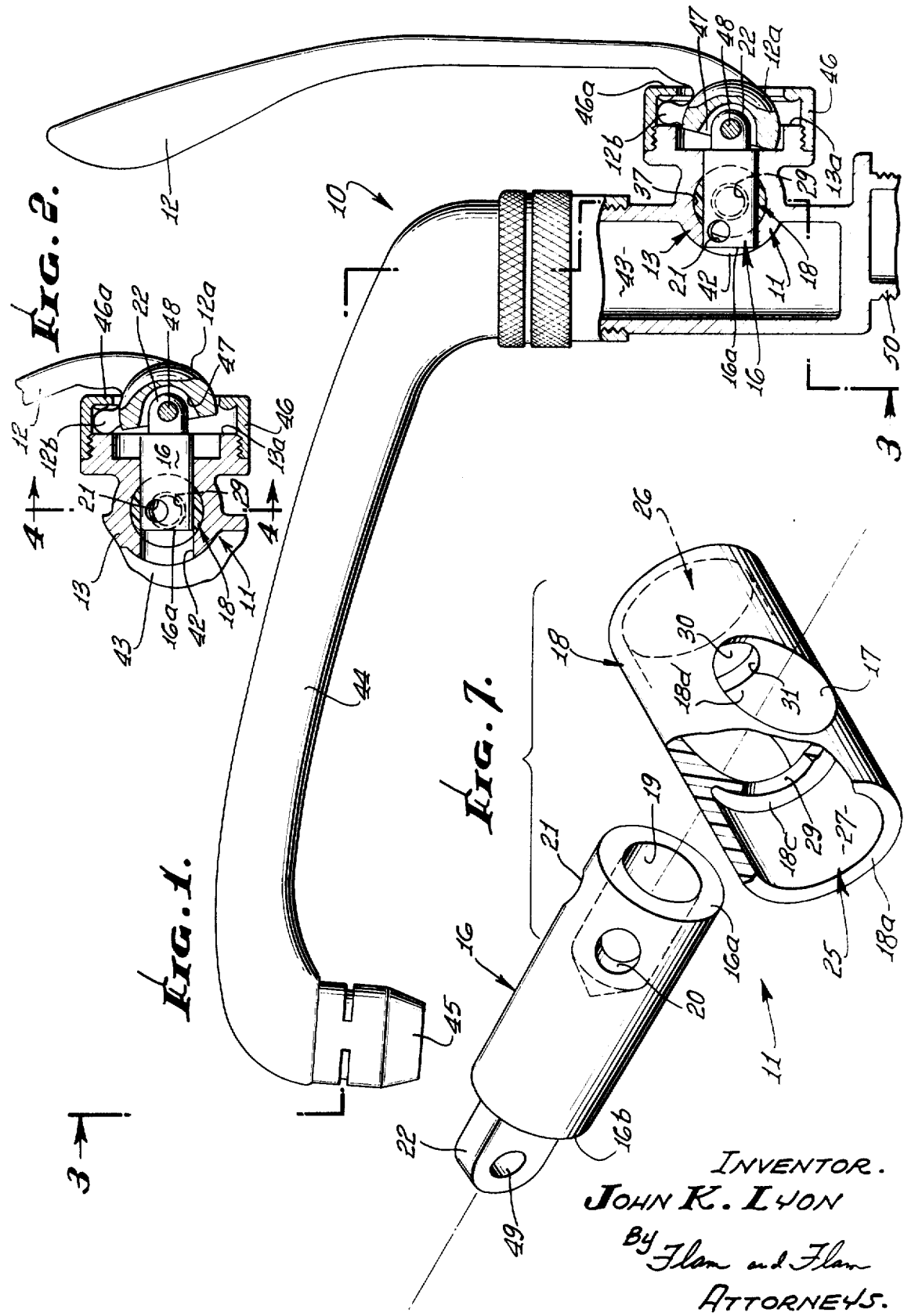

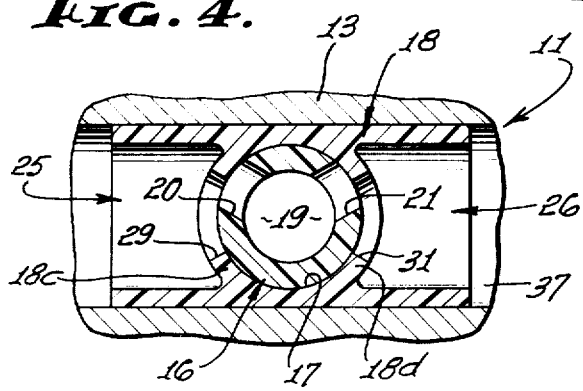
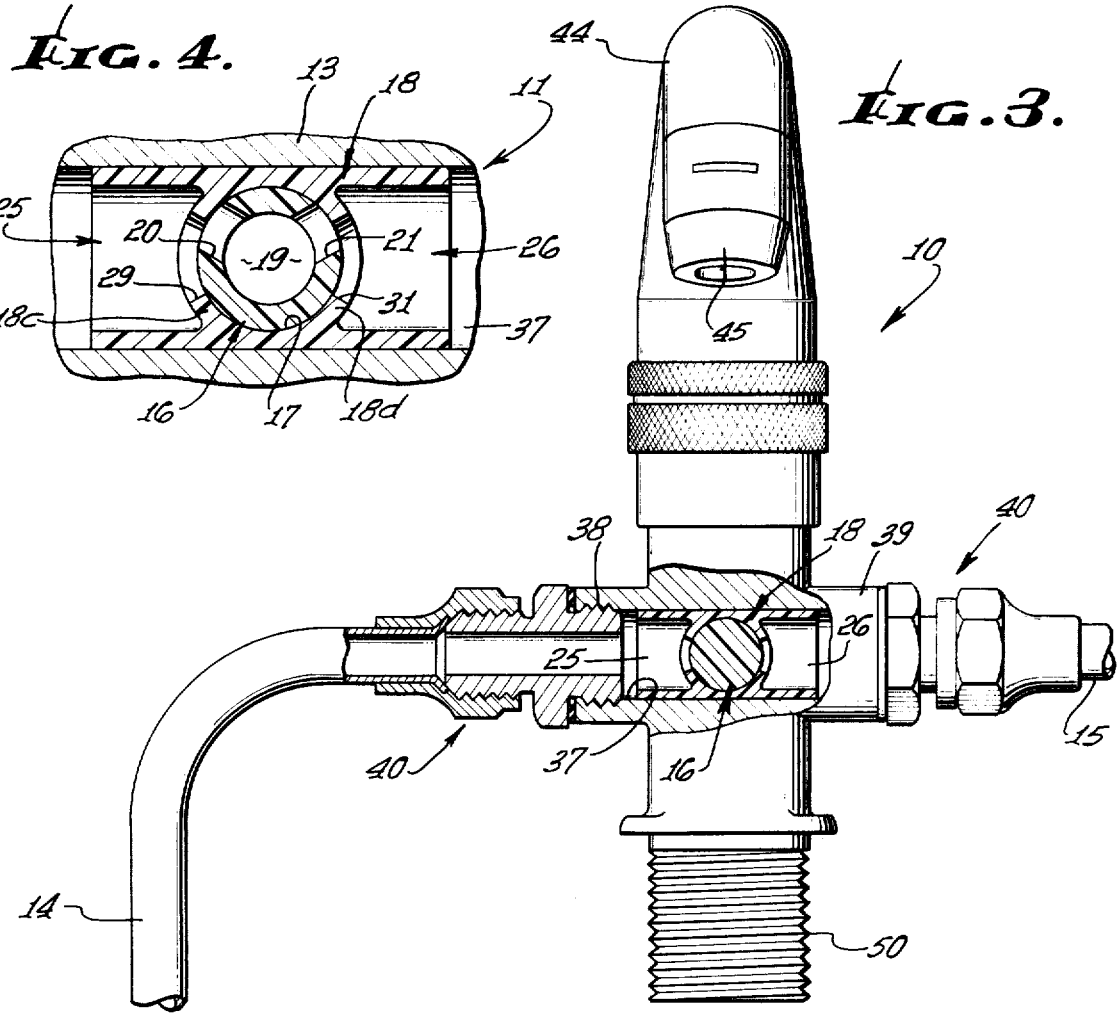
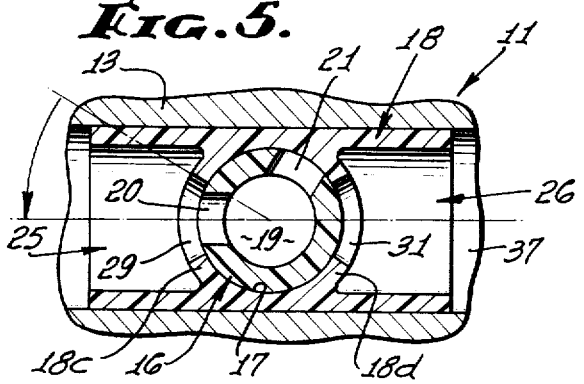
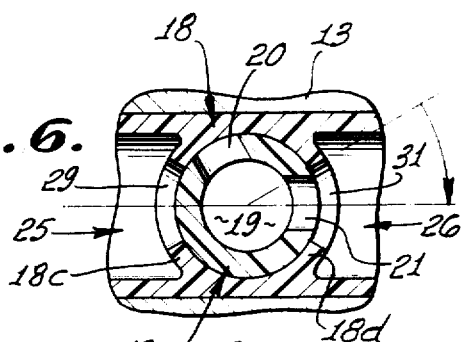
INVENTOR.
JOHN K. LYON
BY Flam and Flam
ATTORNEYS.

SELF-SEALING MIXTURE VALVE UNIT FOR SINGLE-HANDLED SINK OR LAVATORY FIXTURE

BACKGROUND OF THE INVENTION

1. Field of the Invention

The present invention relates to a fluid mixing valve adapted for single handle control of mixture and flow volume, and to a faucet incorporating such a valve.

2. Description of the Prior Art

In recent years, faucets having a single handle to control both water temperature and flow volume have gained widespread acceptance. Typically, such faucets utilize a mixing valve in which linear motion of a valve element turns the water on and off, while rotation of the element controls the relative proportion of hot and cold water.

One class of mixing valves known in the prior art utilizes intricate metal components provided with numerous O-rings to prevent leakage at the metal-to-metal interfaces. Within this class are cartridge-type valves employing telescoping spools situated in a cylindrical housing permanently attached to the hot and cold water lines. Another example in the class is the valve structure shown in U.S. Pat. No. 2,943,792 to Moen. Although such mixing valves are highly commercialized, fabrication of the complex parts, attachment of the O-rings and assembly of the devices are costly and time consuming.

Another class of prior art mixing valves utilizes two ceramic plates in face-to-face contact. Two fluid inlet holes and one fluid outlet hole extend through the bottom ceramic plate, and a downwardly facing concave cavity is provided in the top plate. A control handle is used to slide the top plate over the bottom plate, the relative position of the top plate determining the proportionality of fluid flow from each of the two inlet holes through the concave cavity to the outlet hole. Since there is no metal-to-metal interface in the fluid path, no O-rings are required with such ceramic plate valves. However, a relatively complex mechanism is necessary to achieve motion of the top plate while maintaining it in parallel, face-to-face contact with the lower plate.

The present invention overcomes these and other shortcomings of the prior art by providing a two-piece mixing valve preferably having no metal-to-metal interface and operable by a simple handle mechanism. Components of the inventive valve are not of complex design, and may be fabricated and assembled simply and at very low cost.

SUMMARY OF THE INVENTION

In accordance with the present invention, there is provided a mixing valve which may be incorporated advantageously in a faucet having a single handle to control both fluid mixture and flow volume.

In a preferred embodiment, the mixing valve comprises a flexible valve sleeve having a pair of fluid inlet ports opening via diametrically opposed orifices into a transverse bore. Situated within the bore is a relatively rigid cylindrical valve stem having an axial bore extending partway therethrough from one end of the stem. A pair of holes, smaller than the sleeve orifices and spaced less than 180° apart, open radially into the axial bore. Fluid flow from each inlet port is through the associated orifice and hole to the axial bore which functions as the valve outlet port.

Fluid mixture is controlled by angular movement of the valve stem about its axis which determines the relative overlap of each stem hole with the corresponding orifice, thereby establishing the effective aperture size and hence the fluid flow characteristics from each inlet port. Combined flow volume is controlled by axial motion of the valve stem, which simultaneously changes the degree of registry of both stem holes.

The sleeve and stem may be situated in a valve housing associated with a faucet, and a single handle used to impart independent axial and radial motion to the valve stem. When in the off or flow-preventing position, fluid pressure at the inlet ports forces flexible portions of the sleeve both against the housing and the stem, thereby affecting a leakproof valve seal.

Thus it is an object of the present invention to provide an improved, two-piece mixing valve useful for control of both fluid mixture and flow volume.

Another object of the present invention is to provide a two-piece mixing valve comprising a flexible valve sleeve having a pair of fluid inlet ports communicating via selectively overlapping orifices with an outlet port in a valve stem situated in a transverse bore through the sleeve.

BRIEF DESCRIPTION OF THE DRAWINGS

Detailed description of the invention will be made with reference to the accompanying drawings wherein like numerals designate like parts in the several figures. These drawings, unless described as diagrammatic or unless otherwise indicated, are to scale.

FIG. 1 is a side elevation view, partly cut away and in section, of a single-handled faucet incorporating the mixing valve, the valve being shown in its off position.

FIG. 2 is a fragmentary sectional view of the valve of FIG. 1, but showing the mixing valve open.

FIG. 3 is a front elevation view, partly broken away and in section, of the faucet of FIG. 1 and taken generally along the offset plane indicated by line 3—3 of FIG. 1.

FIGS. 4, 5, and 6 are transverse sectional views, taken along the plane indicated by line 4—4 of FIG. 2, showing different mixing positions of the valve.

FIG. 7 is an enlarged isometric view of the valve stem and valve sleeve components of the mixing valve, the sleeve being partly cut away and shown in section.

DESCRIPTION OF THE PREFERRED EMBODIMENT

The following detailed description is of the best presently contemplated mode of carrying out the invention. This description is not to be taken in a limiting sense but is made merely for the purpose of illustrating the general principles of the invention since the scope of the invention best is defined by the appended claims.

Referring now to the drawings, and particularly to FIGS. 1 and 3 thereof, there is shown a faucet 10 incorporating a mixing valve unit 11 operated by a handle 12. Valve unit 11, which is situated within a valve housing 13, mixes hot water supplied via a line 14 and cold water from a line 15 for discharge by faucet 10.

As best seen in FIG. 7, mixing valve 11 comprises an exteriorly cylindrical valve stem 16 which seats within a bore 17 extending transversely through a valve sleeve 18. The sleeve may be made of neoprene or similar material. The stem may be made of more rigid material such as Teflon resin or the like. An axial bore 19 extending inwardly from one end of the valve stem forms an outlet for valve 11. A pair of flow control holes 20, 21 open radially into the chamber formed by the bore 19; holes 20, 21 are approximately equidistant from stem end 16a, and preferably are radially spaced by less than 180°. A handle-attachment tongue 22 projects rearwardly from the other stem end 16b.

Valve sleeve 18 (FIG. 7) includes a pair of fluid inlet ports 25, 26 each communicating with the transverse bore 17. Inlet port 25 comprises a large cylindrical cavity 27 extending from the outer sleeve end 18a to a thin concave wall 18c in which an orifice 29 is formed. Similarly, inlet port 26 comprises a cavity 30 terminating at a concave wall 18d at which an orifice 31 is formed.

Fluid flows from inlet port 25 via orifice 29 and flow control hole 20 to the stem chamber 19. Fluid flows from inlet port 26 via orifice 31 and flow control hole 21 to the stem chamber. Combined flow volume is determined by moving valve stem 16 axially within bore, 17 thereby simultaneously changing the degree of registry of flow control holes 20, 21 with the inlet orifices 29, 31, as illustrated in FIGS. 1 and 2. Fluid mixture is controlled by angularly moving the stem 16 within bore 17. The flow control holes 20 and 21 are judiciously located so that at the central position of the stem, (FIG. 4) registry of both inlets is approximately 50 percent. Thus as the stem is moved angularly, one orifice opens as the other closes, thereby maintaining an even flow volume as the proportion changes.

Valve sleeve 18 (FIGS. 1 and 3) is slidably inserted into a horizontal bore 37 in the back of a brass or other casting 13. The ends 38 and 39 of the bore open behind the casting 13 and cooperate with suitable fittings 40 for connecting the lines 14 and 15 to the casting.

Valve stem 16 is disposed within a rearwardly opening bore 42 (FIGS. 1 and 2) that intersects the bore 37 in which the sleeve is accommodated. The stem, by interfitting the sleeve, locates the sleeve in its bore.

The inner end of the stem bore 42 opens frontally into a large fluid receiving chamber 43 of the casting 13.

The handle 12 has an enlarged hemispherical lower end terminating in a flat surface. This surface has a slot 47 receiving the stem tongue 22. A pin 48 pivotally connects the stem to the handle 12. The end 12a has an upwardly extending fulcrum 12b which is confined in an annular groove formed between flange 46a of a retaining ring 46 and the end surface 13a of the housing 13.

The handle end 12a cranks the stem inwardly and outwardly upon forward and rearward movement of the handle whereby flow is determined.

In FIG. 1, valve 11 is shown in its off position. The valve stem 16 is axially positioned so that holes 20 and 21 are forward of the inlet orifices 29 and 31. As a result, these orifices are completely blocked by the exterior surface of valve stem 16. The fluid pressure against flexible walls 18c and 18d forces them against valve stem 16, thereby achieving a leakproof seal.

To initiate fluid flow through valve 11, handle 12 is pulled forwardly to the position shown in FIG. 2, resulting in rearward movement of valve stem 16. A portion of one or both of holes 20 and 21 moves into registry with the corresponding orifices 29 and 31. As a result, fluid supplied via one or both of inlet ports 25 and 26 flows into the stem and then into the casting chamber 43, swing spout 44 and aerator 45. Angular movement of the handle 12 adjusts proportion.

Fluid mixture control is illustrated in FIGS. 4, 5, and 6. In FIG. 4, the inlets are each about half open. In FIG. 5, water flows only from one inlet; in FIG. 6, water flows only from the other inlet. Obviously intermediate positions determine various relative flow from the two inlets.

The valve housing is attached to a sink deck by a mounting collar 50. A suitable decorative cover plate (not shown) may be clamped in place to conceal the casting 13.

The two operative elements of the mixing valve can be quite readily removed and replaced.

I claim:

1. In combination:
a rigid valve housing having first and second intersecting perpendicular bores therethrough,
a mixing valve comprising;
 a. a flexible valve sleeve having a transverse stem receiving bore therethrough, said valve sleeve being disposed within said valve housing first bore, said stem receiving bore being aligned with said valve housing second bore, first and second fluid inlet ports opening through said sleeve into said stem receiving bore, each port including an inlet cavity terminating at a concave wall having an orifice through to said stem receiving bore,
 b. a valve stem having an axial bore extending partway therethrough from one end thereof and a pair of holes opening radially into said axial bore, said valve stem seating within said stem receiving bore and being adapted for independent axial and radial motion with respect thereto,
means, attached through one end of said valve housing second bore to the other end of said valve stem, for independently axially and radially positioning said stem with respect to said valve sleeve to control respectively the volume and mixture of fluid.

2. A mixing valve as defined in claim 1 wherein said valve sleeve is exteriorly cylindrical, said transverse bore extending generally perpendicularly to the axis of said sleeve.

3. A mixing valve as defined in claim 2 wherein said first and second fluid inlet ports are disposed on diametrically opposite sides of said transverse bore and respectively communicate with the ends of said cylindrical valve sleeve.

4. The combination defined in claim 1, further comprising a faucet incorporating said valve housing, said valve stem axial bore communicating with the fluid channel through said faucet, and wherein said means for positioning includes a faucet handle connected to said valve stem.

5. A mixing valve as defined in claim 1 wherein said valve stem and valve sleeve are each fabricated to neoprene, plastic or like resilient material, fluid pressure in said inlet ports resiliently sealing the concave wall portions of said valve sleeve against said valve stem to prevent fluid leakage through said mixing valve when said valve is set to prevent fluid flow therethrough.

6. A mixing valve comprising:
a rigid valve housing having first and second perpendicular, intersecting bores therethrough, the ends of said first bore providing fluid inlets to said mixing valve, one end of said second bore providing a fluid outlet from said mixing valve,
a resilient, exteriorly cylindrical valve sleeve disposed within said first bore, said sleeve including a stem-receiving bore extending transversely therethrough axially aligned with said second bore, said valve sleeve having an axial cavity extending inwardly from each end thereof, said cavities terminating at respective first and second thin concave walls forming opposite sides of said stem-receiving bore, said walls including respective first and second orifices, said cavities and orifices facilitating fluid communication between said fluid inlets and said stem-receiving bore,
an exteriorly cylindrical, rigid valve stem disposed within said stem-receiving bore and adapted for independent axial and radial movement with respect to said valve sleeve, said valve stem having an axial bore extending partway therethrough and communicating with said one end of said valve housing second bore, and a pair of spaced holes extending radially into said axial bore, the radial orientation of said stem with respect to said sleeve determining the proportion of fluid flowing from each of said inlets through the associated orifice and hole to said outlet, the relative axial position of said stem determining the volume of fluid flow.

7. A mixing valve as defined in claim 6 wherein said holes are radially separated by less than 180°, radial orientation of said stem to align either hole with the associated orifice causing the other orifice to be blocked by said valve stem, intermediate radial orientations of said valve stem causing said holes to overlap relatively different portions of the associated orifices, thereby providing control of fluid mixture.

8. A mixing valve as defined in claim 6 wherein said holes are equidistant from an end of said valve stem, said stem being adapted to move from a fluid flow preventing axial position in which both orifices are blocked by said valve stem to other axial positions in which increasingly greater portions of both of said holes overlap said orifices, thereby providing control of fluid flow volume.

9. A mixing valve as defined in claim 6 wherein said valve stem is tight fit within said stem-receiving bore, input fluid pressure pressing portions of said concave walls adjacent said orifices against said valve stem to prevent fluid leakage when said mixing valve is set to prevent fluid flow therethrough, said first bore preventing outward ballooning of said sleeve cavities when said valve is set to prevent fluid flow.

10. A mixing valve as defined in claim 9 further comprising:
a flat tongue extending from said valve stem through the other end of said valve housing second bore, and
pivotally connected valve handle means for imparting axial and radial motion to said valve stem via said tongue.

11. In a mixing valve structure:
a. a unitary, substantially cylindrical valve body made of flexible material adapted to be inserted into a cylindrical bore of a rigid casting or housing;
b. said body having inlet cavities at opposite ends extending inwardly and terminating at convex walls;
c. the inside concave surfaces of said walls complementing each other to form a transverse bore;
d. said convex walls having inlet orifices opening into said transverse bore, each orifice having a smaller diameter than the associated cavity;
e. a valve control member made of relatively rigid material and fitted into said transverse bore;
f. said valve control member having valve control means respectively registrable with said orifices to degrees dependent upon the angular orientation of said valve control member and the axial position of said valve control member thereby to determine relative proportion and combined flow;
g. said convex walls being conformable to the exterior surface configuration of said valve control member to provide fluid seals therewith when said valve control means is out of registry with said orifices.

12. The mixing valve structure as set forth in claim 11 in which said valve body at the outer ends of both of said inlet cavities is sufficiently thin to cause said body to seal against said cylindrical housing bore.

* * * * *